E. I. DODDS.
BAR FOR BOLT BLANKS.
APPLICATION FILED SEPT. 14, 1915.
1,209,948.
Patented Dec. 26, 1916.
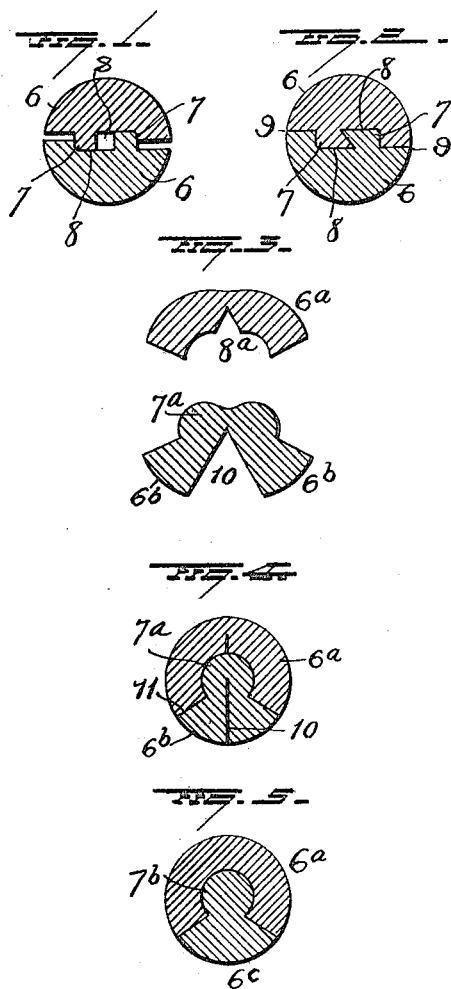
WITNESSES
INVENTOR
E. I. Dodds
Attorney

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

BAR FOR BOLT-BLANKS.

1,209,948.  Specification of Letters Patent.  Patented Dec. 26, 1916.

Original application filed June 15, 1915, Serial No. 34,267. Divided and this application filed September 14, 1915. Serial No. 50,661.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Bars for Bolt-Blanks; and I do hereby declare the following to be a full, clear, and exact description of the invention, such as will enable others skilled in the art to which it appertains to make and use the same.

My invention relates to an improvement in bars for bolt blanks, and is a division of application Serial Number 34,267 filed by me June 15, 1915.

The invention consists in a bar from which bolt blanks are made, composed of two members interlocked by a longitudinal rib on one member within a longitudinal groove in the other member, the said bar having oppositely disposed longitudinal slots extending from the outer surface of the bar inwardly toward the said rib or groove.

In the accompanying drawings, Figure 1 is a view in cross section of the two members assembled but not united; Fig. 2 is a similar view after they have been rolled, and Figs. 3, 4 and 5 are views of modified forms.

In the manufacture of the bar I take two semi-cylindrical sections 6, one of which has a rib and the other a groove, as shown in Figs. 3, 4 and 5, or preferably two semi-cylindrical bars each of which has a rib 7 and a groove 8 as shown in Figs. 1 and 2, the ribs and grooves extending throughout the length of the bars. In the construction shown in Figs. 1 and 2 the ribs 7 are deeper than the grooves and project beyond the flat, inner or meeting faces of the bars 6, and are so located that when the two bars are assembled, they will be side by side. Each rib rests on the floor of the groove in the other bar thus holding the inner or meeting faces of the two bars slightly separated as shown in Fig. 1. By now passing the bars thus assembled between rolls, the ribs 7 being structurally weaker than the bodies of the bars will be crushed and deformed and spread out within the grooves and fill the latter and as the crushing effect on each rib is toward the other rib they will interlock as shown in Fig. 2. This distortion of the ribs permits the meeting faces of the two bars 6 to come into contact with each other without welding, thus forming a compound bar circular in cross section with two oppositely disposed longitudinal slots 9 extending throughout the length of the bar.

A bar thus formed is of the same tensile capacity as a solid bar of the same cross sectional area, but is more flexible, which adapts it particularly for the manufacture of blanks for stay bolts for boilers and also for bolts used in railway track construction. After the bar has been thus formed, it may be twisted longitudinally from end to end so that the two slots will be in the form of spirals extending from end to end of the bar.

To make bolts from the compound bar, the latter is reheated and is fed to a machine which upsets the head and cuts off the blank. By twisting the bar from which the bolts are cut, the twist will be constant and uniform from end to end and consequently uniform in the blanks that are cut from the bar. The upsetting of the heads welds the walls of the slots at the heads, but leaves the walls of the slots in the shank disconnected thus permitting the shank to yield or give under certain stresses.

In Fig. 3 one bar $6^a$ is provided with a curved outer face and a centrally located longitudinal groove $8^a$ on its inner face, and the other bar $6^b$ is centrally slotted longitudinally as at 10, and curved on its outer face and provided on its inner or meeting face with a compound curbed rib $7^a$ extending throughout its length.

To assemble the parts the bar $6^a$ is placed on the bar $6^b$, with the rib $7^a$ of the latter within the groove $8^a$ of the former, and is passed between rolls which close the slot 10, thus converting the compound curved rib into an arc shaped rib greater than half a circle and closing the bar $6^a$ over said rib, thus forming a cylindrical bar composed of two members permanently secured together without welding. By this method of manufacture, a slot 11 is formed between each edge of the bar $6^a$ and the shoulders on bar $6^b$ with which said edges abut and also by the slot 10. If desired this slot 10 may be omitted as shown in Fig. 5. In this construction the bar $6^c$, which corresponds to section $6^b$ of Fig. 3 is made originally with an arc-shaped rib 7ᵇ greater than a half circle so as to interlock with the bar 6ᵃ when the latter is closed onto the same.

Having fully described my invention what I claim as new and desire to secure by Letters-Patent, is:—

1. A bar for bolt blanks composed of two semi-cylindrical members interlocked by a longitudinal rib on one member within a longitudinal groove in the other member, the said bar having oppositely disposed longitudinal slots extending from the outer surface of the bar inwardly toward the said rib and groove.

2. A bar for bolt blanks composed of two members interlocked by a longitudinal rib on one member within a longitudinal groove in the other member, the said bar having oppositely disposed longitudinal slots extending from the outer surface of the bar inwardly toward the said rib and groove.

3. A bar for bolt blanks composed of two semi-cylindrical members interlocked by a longitudinal rib on each member within a longitudinal groove in the other member, the said bar having oppositely disposed longitudinal slots extending from the outer surface of the bar inwardly toward the said rib and groove.

In testimony whereof, I have signed this specification in the presence of two subscribing witnesses.

ETHAN I. DODDS.

Witnesses:
F. H. ALLISON,
EDWIN S. RYCE.